(12) United States Patent
Tetsuka et al.

(10) Patent No.: US 10,221,919 B2
(45) Date of Patent: Mar. 5, 2019

(54) LONG-OBJECT GUIDE DEVICE AND AFFIXATION MEMBER

(71) Applicant: TSUBAKIMOTO CHAIN CO., Osaka-shi, Osaka (JP)

(72) Inventors: Takayuki Tetsuka, Osaka (JP); Masashi Kunii, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 15/564,233

(22) PCT Filed: Apr. 18, 2016

(86) PCT No.: PCT/JP2016/062271
§ 371 (c)(1),
(2) Date: Oct. 4, 2017

(87) PCT Pub. No.: WO2016/175080
PCT Pub. Date: Nov. 3, 2016

(65) Prior Publication Data
US 2018/0128349 A1 May 10, 2018

(30) Foreign Application Priority Data
Apr. 27, 2015 (JP) .................................. 2015-090456

(51) Int. Cl.
*F16G 13/16* (2006.01)
*F16L 3/00* (2006.01)
*H02G 11/00* (2006.01)

(52) U.S. Cl.
CPC ................ *F16G 13/16* (2013.01); *F16L 3/00* (2013.01); *H02G 11/00* (2013.01)

(58) Field of Classification Search
CPC ............. F16G 13/16; H02G 11/00; F16L 3/32
(Continued)

(56) References Cited

U.S. PATENT DOCUMENTS 6,858,797 B2 * 2/2005 Sheikholeslami ...... F16G 13/16
174/480
7,017,328 B2 * 3/2006 Komiya .................. F16G 13/16
248/49

(Continued)

FOREIGN PATENT DOCUMENTS

CN 201382125 Y 1/2010
CN 102235550 A 11/2011
(Continued)

OTHER PUBLICATIONS

International Search Report dated Jul. 19, 2016, issued in counterpart application No. PCT/JP2016/062271. (2 pages).
(Continued)

*Primary Examiner* — David B Jones
(74) *Attorney, Agent, or Firm* — Westerman, Hattori, Daniels & Adrian, LLP

(57) ABSTRACT

A long object guide device includes an articulated support member, which includes link members arranged in series. Adjacent ones of the link members are rotationally coupled to each other. The articulated support member is permitted to turn to a predetermined bending radius in a first direction that intersects a series arrangement direction. The articulated support member is restricted from turning in a second direction that is opposite to the first direction. The long object guide device guides flexible covered wires while protecting the covered wires. The guide device includes an end. The guide device includes a fixation member that is fixable to a counterpart member while coupled to one of the link members that corresponds to the end of the guide device.

4 Claims, 9 Drawing Sheets

(58) Field of Classification Search
USPC .......................................... 59/78.1; 248/68.1
See application file for complete search history.

(56) References Cited

U.S. PATENT DOCUMENTS

| | | | | |
|---|---|---|---|---|
| 7,240,477 | B1 * | 7/2007 | Dunfee | F16G 13/16 |
| | | | | 248/49 |
| 7,971,833 | B2 * | 7/2011 | Utaki | H02G 11/006 |
| | | | | 248/49 |
| 8,882,052 | B2 * | 11/2014 | Komiya | F16G 13/20 |
| | | | | 248/51 |
| 2011/0240805 | A1 * | 10/2011 | Komiya | F16G 13/20 |
| | | | | 248/68.1 |
| 2013/0212998 | A1 | 8/2013 | Komiya | |

FOREIGN PATENT DOCUMENTS

| | | |
|---|---|---|
| CN | 202867706 U | 4/2013 |
| CN | 103256339 A | 8/2013 |
| JP | 2-36643 U | 3/1990 |
| JP | 2011-214704 A | 10/2011 |
| JP | 2012-170186 A | 9/2012 |
| JP | 2013-170642 A | 9/2013 |

OTHER PUBLICATIONS

International Preliminary Report on Patentability (Form PCT/IB/373) issued in counterpart International Application No. PCT/JP2016/062271 dated Oct. 31, 2017, with Form PCT/ISA/237 (5 pages).
Office Action dated Oct. 8, 2018, issued in counterpart Chinese Application No. 201680022493.6. (7 pages).

* cited by examiner

LONG-OBJECT GUIDE DEVICE AND AFFIXATION MEMBER

BACKGROUND OF THE INVENTION

The present invention relates to a long object guide device for accommodating a long object, which may be a flexible cable or tube used to feed power or liquid to a movable portion of a machine tool, and guiding the long object in accordance with movement of the movable portion. The present invention also relates to a fixation member of the guide device.

Patent Document 1 discloses a conventional example of such a long object guide device. The device includes articulated support members, each formed by synthetic plastic block bodies coupled to each other, and a flexible belt member, which is formed by tubular storing portions arranged in parallel. The articulated support members assume straight and bending positions. Each tubular storing portion stores the corresponding one of the articulated support members and long objects.

A first connector unit covers the fixed ends of the articulated support members, the long objects, and the flexible belt member over their entire width. A second connector unit covers the movable ends of the articulated support members, the long objects, and the flexible belt member over their entire width.

PRIOR ART DOCUMENT

Patent Document

Patent Document 1: Japanese Laid-Open Patent Publication No. 2012-170186

SUMMARY OF THE INVENTION

With the guide device described above, any change in the width of the flexible belt member resulting from a change in the number of the tubular storing portions requires redesigning of the first and second connector units in accordance with the changed width. This guide device is therefore less versatile.

The present invention focuses on such a problem of the conventional technology, and it is an objective of the present invention to provide a versatile long object guide device and a fixation member of the guide device.

Means and operational advantages for solving the above-described problem will now be described.

To achieve the foregoing objective and in accordance with one aspect of the present invention, a long object guide device for protecting and guiding a flexible long object is provided. The long object guide device includes an articulated support member including a plurality of link members arranged in series. Adjacent ones of the link members are rotationally coupled to each other. The articulated support member is permitted to turn to a predetermined bending radius in a first direction that intersects a series arrangement direction. The articulated support member is restricted from turning in a second direction that is opposite to the first direction. The guide device includes an end. The guide device includes a fixation member that is fixable to a counterpart member while coupled to one of the link members that corresponds to the end of the guide device.

With this configuration, any change in the width of the guide device resulting from a change in the type or the number of the long objects does not require modification of the fixation members. This increases the versatility of the long object guide device.

The above-described long object guide device preferably includes a plurality of flexible tubular members coupled together and arranged in parallel. The tubular members preferably include at least one first tubular member in which the articulated support member is inserted, and at least one second tubular member in which the long object is inserted.

With this configuration, the articulated support members support the long object through the tubular members.

In the above-described long object guide device, the fixation member preferably includes a fixing portion, which is fixable to the counterpart member, and a coupling portion, which is rotationally coupled to the link member that corresponds to the end of the guide device.

This configuration allows rotation of the fixation members, reducing the extra length required for the articulated support members.

In the above-described long object guide device, the fixing portion and the coupling portion are preferably integral with each other.

This helps to reduce the number of components of the long object guide device.

In the above-described long object guide device, the fixing portion preferably includes two flat surfaces, which are opposite to each other and extended parallel to the series arrangement direction.

When multiple fixation members are stacked and fixed to the counterpart member, the flat surfaces of the fixing portions of the fixation members are stacked on top of each other. This allows the multiple fixation members to be stacked in a stable manner.

To achieve the foregoing objective and in accordance with one aspect of the present invention, a fixation member for a long object guide device for protecting and guiding a flexible long object is provided. The long object guide device includes an articulated support member including a plurality of link members arranged in series. Adjacent ones of the link members are rotationally coupled to each other. The articulated support member is permitted to turn to a predetermined bending radius in a first direction that intersects a series arrangement direction. The articulated support member is restricted from turning in a second direction that is opposite to the first direction. The guide device includes an end. The fixation member includes a coupling portion, which is configured to be coupled to one of the link members that corresponds to the end of the guide device, and a fixing portion, which is fixable to a counterpart member.

With such a structure, any change in the width of the long object guide device resulting from a change in the type or the number of the long objects does not require modification of the fixation members. This increases the versatility of the long object guide device.

The present invention increases the versatility of the long object guide device.

DETAILED DESCRIPTION OF THE PREFERRED EMBODIMENTS

A long object guide device according to one embodiment will now be described with reference to the drawings.

Figure 1:
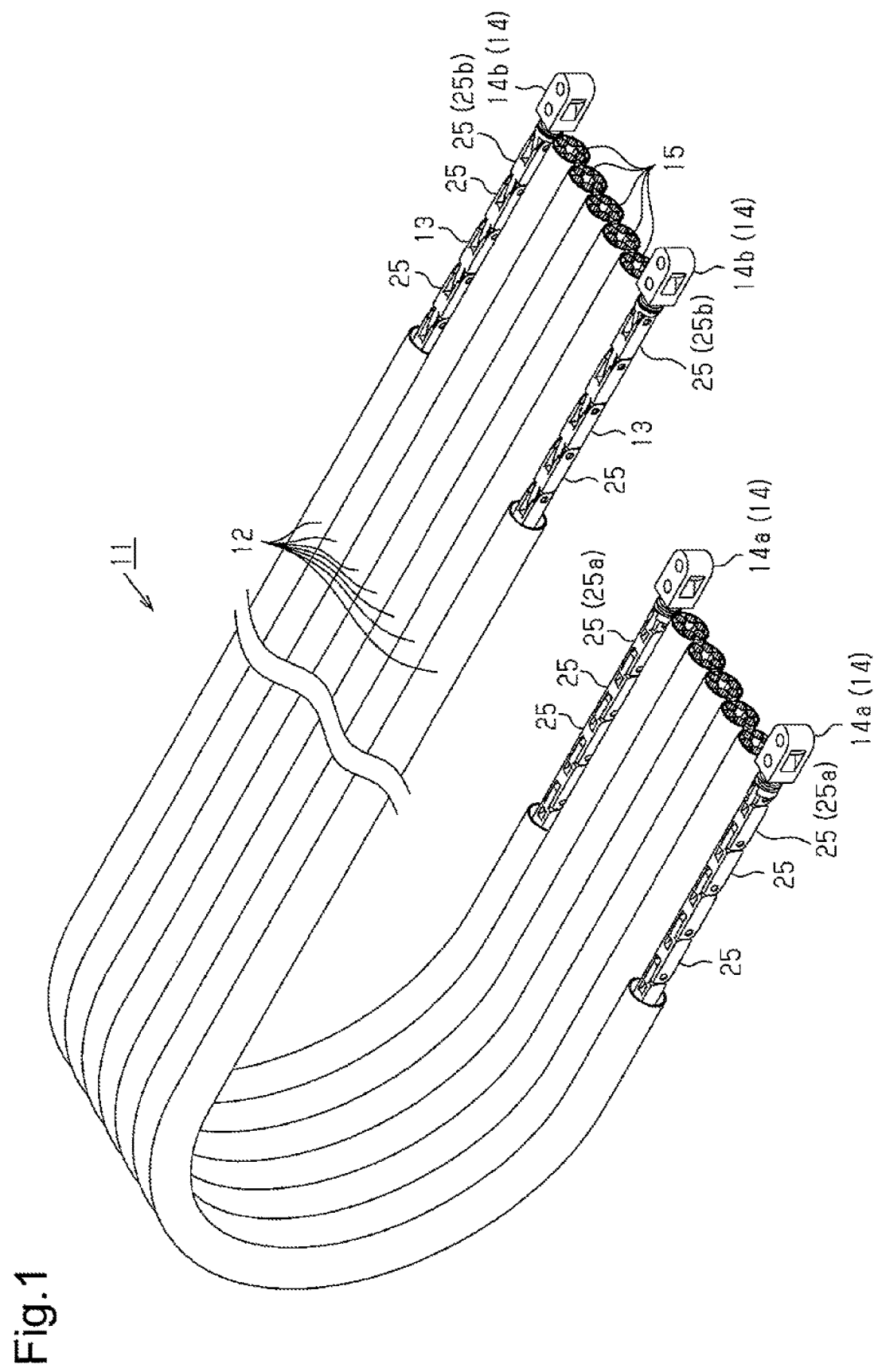
FIG. 1 is a partially cutaway perspective view of a long object guide device of one embodiment.
Figure 2:
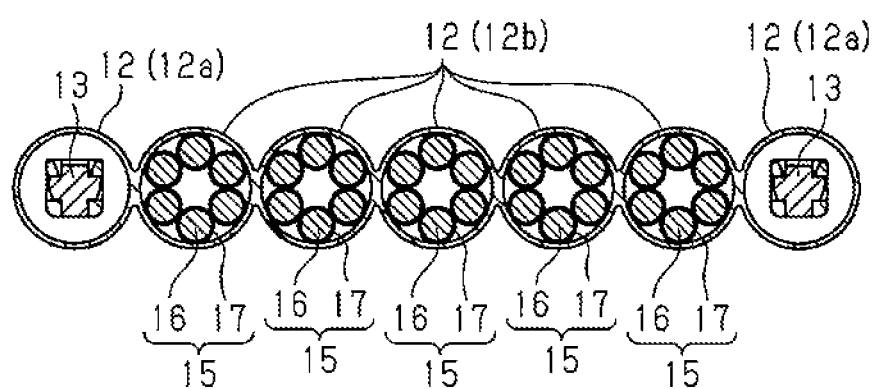
FIG. 2 is an end view of FIG. 1.

As shown in FIGS. 1 and 2, a long object guide device 11 includes a plurality of flexible tubular members 12, which is made of synthetic plastic, a plurality of long articulated support members 13, each inserted in a tubular member 12, and fixation members 14, which are coupled to the opposite ends of the articulated support members 13. The present embodiment includes seven tubular members 12 and two articulated support members 13. The seven tubular members 12, each having the shape of a long tube, are coupled to each other or formed integrally to form the shape of a strip.

As shown in FIG. 2, of the seven tubular members 12, the two tubular members 12 at the opposite ends each receive an articulated support member 13. Of the seven tubular members 12, the five tubular members 12 other than the two tubular members 12 at the opposite ends each receive covered wires 15, which serve as flexible long objects. The tubular members 12 in which the articulated support members 13 are inserted are referred to as first tubular members 12a, and the tubular members 12 in which the covered wires 15 are inserted are referred to as second tubular members 12b. The seven tubular members 12 of the present embodiment include two first tubular members 12a and five second tubular members 12b. In the present embodiment, six covered wires 15 are inserted in each second tubular member 12b. Each covered wire 15 is formed by covering a wire 16 with an insulator 17.

Figure 3:
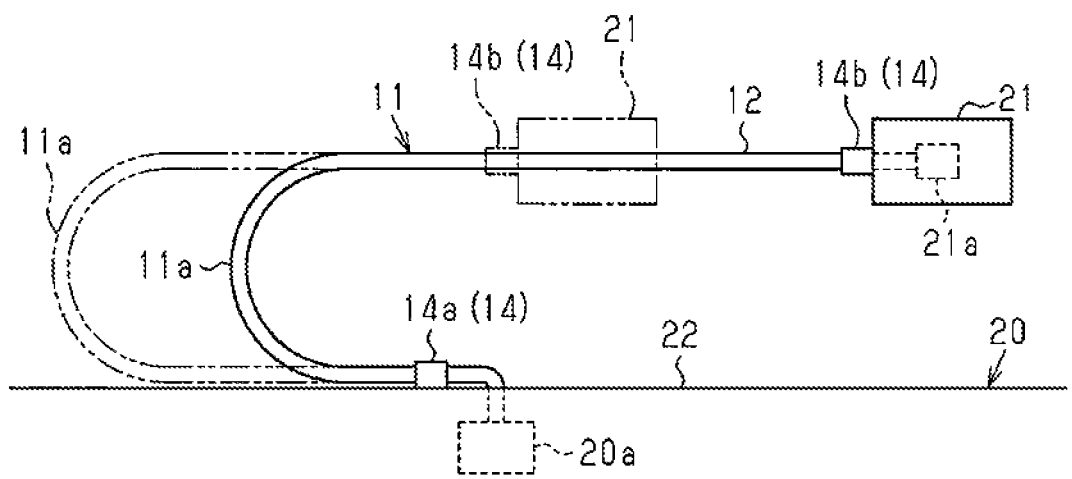
FIG. 3 is a side view schematically showing the state in which the long object guide device of FIG. 1 is used.

As shown in FIG. 3, the covered wires 15 are used to supply power to a movable member 21 from a power source 20a of equipment 20. The movable member 21 is a movable component of the equipment 20, which serves as a counterpart member. The long object guide device 11 is used to protect and guide the covered wires 15. The two fixation members 14 that are located on the fixed end of the long object guide device 11 are referred to as first fixation members 14a and fixed to a predetermined position of an attachment surface 22 of the equipment 20, which is substantially parallel to the movement path of the movable member 21, for example. The two fixation members 14 that are located on the movable end of the long object guide device 11 are referred to as second fixation members 14b and fixed to the movable member 21, which serves as a counterpart member.

As shown in FIG. 3, the sections of the covered wires 15 in the second tubular members 12b that extend beyond the first fixation members 14a are connected to the feed terminal of the power source 20a of the equipment 20. The sections of the covered wires 15 in the second tubular members 12b that extend beyond the second fixation members 14b are connected to the receiving terminal of an electric device 21a in the movable member 21. The covered wires 15 thus supply the necessary power to the electric device 21a in the movable member 21 from the power source 20a in the equipment 20.

The section of the long object guide device 11 between the first fixation members 14a and the second fixation members 14b extends from the fixed end away from the movable end in the movable direction of the movable member 21, forms a semicircular curved section 11a, and then extends in the reversed direction. The section of the long object guide device 11 extending from the curved section 11a to the movable end is suspended in the air and extended substantially linearly in the moving direction of the movable member 21.

The long object guide device 11 protects and guides the covered wires 15, which are inserted in the second tubular members 12b (FIG. 1), in accordance with the reciprocating movement of the movable member 21, to which the second fixation members 14b are fixed. The curved section 11a of the long object guide device 11 reciprocates in accordance with the reciprocating movement of the movable member 21.

Figure 4:
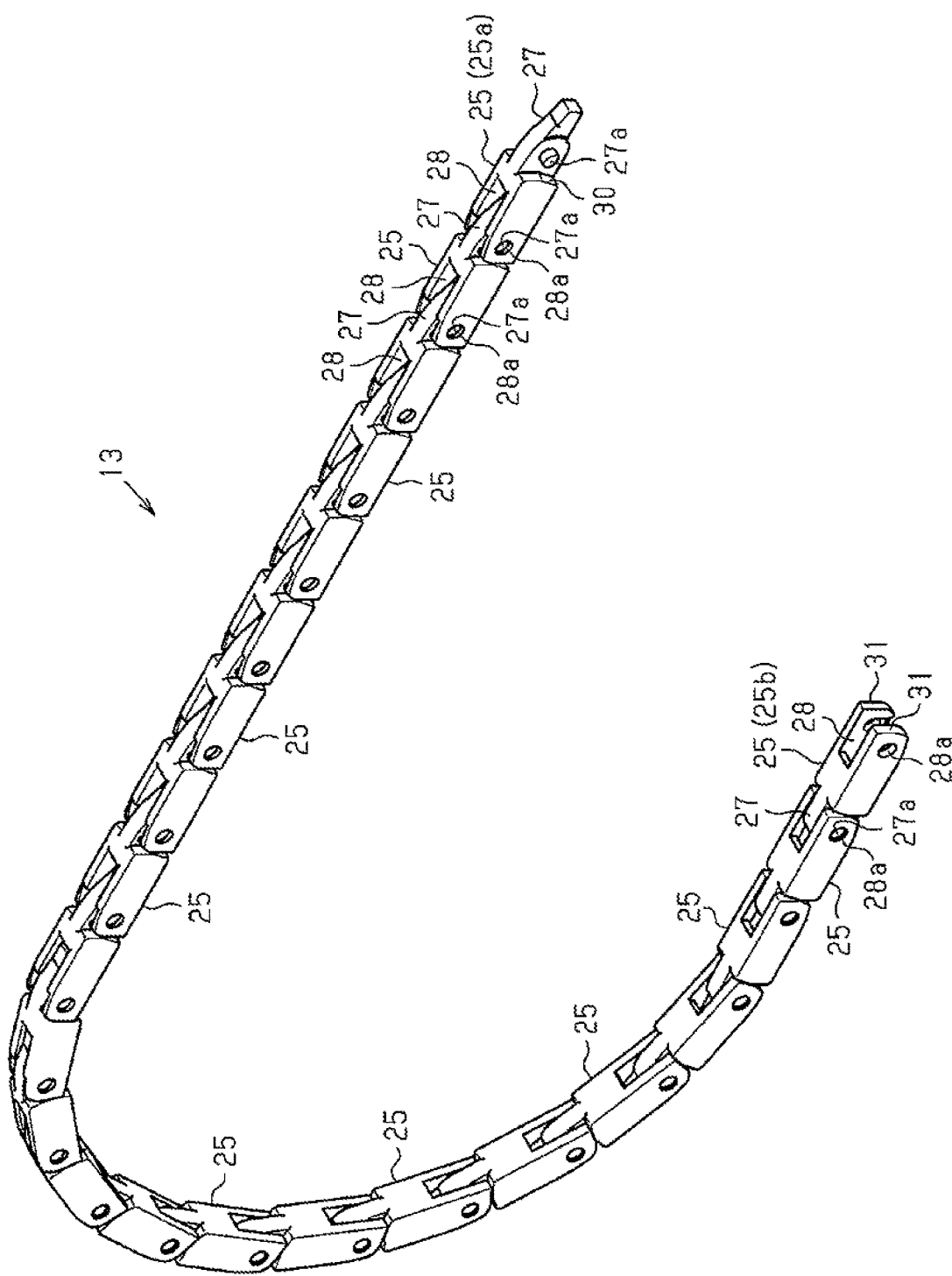
FIG. 4 is a perspective view showing an articulated support member of the long object guide device of FIG. 1.

As shown in FIGS. 3 and 4, each articulated support member 13 is formed by a plurality of link members 25 arranged in series. Adjacent ones of the link members 25 are rotationally coupled to each other. The articulated support member 13 can turn in a first direction that intersects the series arrangement direction (the longitudinal direction) to a predetermined bending radius R (see FIG. 9). On the other hand, the articulated support member 13 is restricted from turning in a second direction opposite to the first direction.

That is, the articulated support member 13 can bend in the first direction to the predetermined bending radius R (FIG. 9) but cannot bend in the second direction, which is opposite to the first direction, from the straight position. In other words, the minimum bending radius of the articulated support member 13 is set such that the bending radius of the curved section 11a, which is formed between the fixed end and the movable end of the long object guide device 11, remains greater than a predetermined bending radius when the fixed end and the movable end of the long object guide device 11 are fixed to the equipment 20 and the movable member 21, respectively.

The section of the long object guide device 11 that is located between the curved section 11a and the movable end and extended substantially horizontally in the air is subjected to the sagging force caused by its own weight. However, the articulated support members 13 in this section of the long object guide device 11 resist bending in the sagging direction since the articulated support members 13 are configured so as not to bend from the straight position in the direction opposite to the direction in which the articulated support members 13 are permitted to bend. That is, the long object guide device 11 is restricted from bending in the sagging direction. The two articulated support members 13 are arranged in the two first tubular members 12a on the opposite sides of the long object guide device 11 such that the two articulated support members 13 are permitted to bend in the same direction.

The structure of the link members 25 forming the articulated support members 13 is now described in detail.

Figure 5:
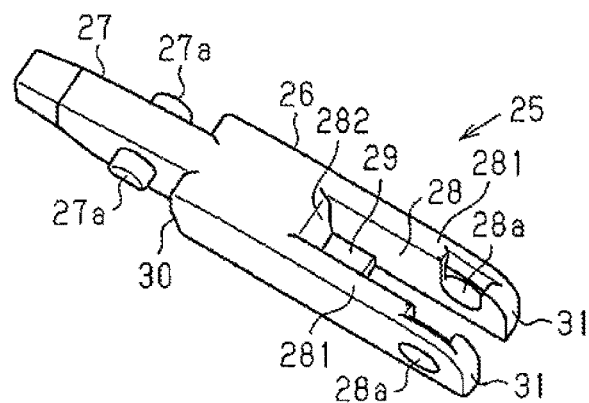
FIG. 5 is a perspective view showing a link member of the articulated support member of FIG. 4.

As shown in FIGS. 4 and 5, each link member 25 includes a base 26, which substantially has the shape of a block, an extension 27, which extends from the central area of the front part of the base 26 and is narrower than the base 26, and a recess 28, which is formed in the rear part of the base 26 and in which the extension 27 of the adjacent link member 25 is inserted. A pair of shaft portions 27a protrudes from the opposite sides of the extension 27.

The base 26 includes two side walls 281 defining the recess 28, and a pair of holes 28a extends through the side walls 281. A plate-shaped first restriction portion 29 is formed in the recess 28. The first restriction portion 29 connects the side walls 281 and a base wall 282, which define the recess 28. A pair of second restriction portions 30 is formed in the front part of the base 26. The second restriction portions 30 are inclined surfaces located on the opposite sides of the extension 27.

The distal end faces of the side walls 281 defining the recess 28 function as contact surfaces 31, which may come into contact with the pair of second restriction portions 30 of the adjacent link member 25. The pair of shaft portions 27a of one of two adjacent link members 25 is inserted into the pair of holes 28a in the other link member 25, so that the two adjacent link members 25 are coupled to be rotational about the pair of shaft portions 27a.

Figure 8:
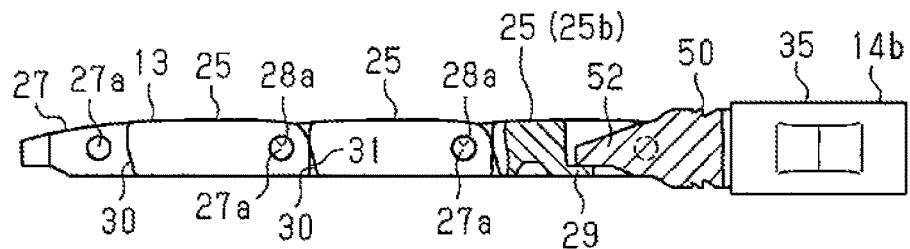
FIG. 8 is a partially cutaway side view showing the straight position of the articulated support member to which the second fixation member is coupled.

Referring to FIG. 8, the extension 27 of one of two adjacent link members 25 comes into contact with the first restriction portion 29 in the recess 28 of the other link member 25, thereby restricting bending (turning) of the articulated support member 13 in the second direction (upward as viewed in FIG. 8) from the straight position (the position shown in FIG. 8).

Figure 9:
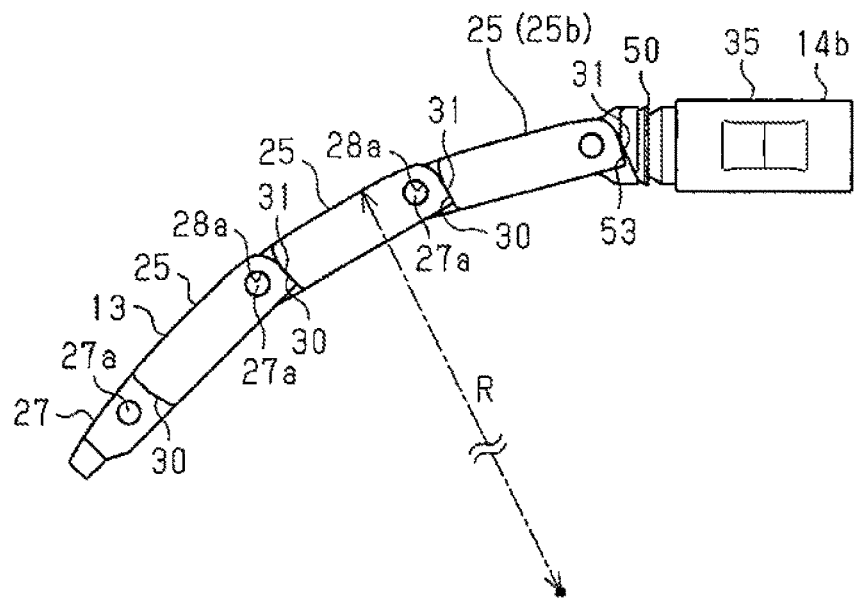
FIG. 9 is a side view showing the bent position of the articulated support member to which the second fixation member is coupled.

As shown in FIG. 9, the pair of second restriction portions 30 of one of two adjacent link members 25 come into contact with the two contact surfaces 31 of the other link member 25, thereby restricting bending (turning) of the articulated support member 13 in the first direction (downward as viewed in FIG. 9) within the range up to the predetermined bending radius R. That is, the bending (turning) of the articulated support member 13 in the first direction is restricted within the range up to the predetermined bending radius R. The articulated support member 13 is configured so as not to bend to a bending radius that is less than the predetermined bending radius R.

The structure of the fixation members 14 is now described in detail.

Each articulated support member 13 is formed by a plurality of link members 25 coupled in series. The fixation member 14 that is coupled to the link member 25 corresponding to the fixed end of the long object guide device 11 differs in shape from the fixation member 14 that is coupled to the link member 25 corresponding to the movable end of the long object guide device 11. Of the plurality of link members 25 forming the articulated support member 13, the link member 25 corresponding to the fixed end of the articulated support member 13 is referred to as a first link member 25a, and the link member 25 corresponding to the movable end is referred to as a second link member 25b. The fixation member 14 coupled to the extension 27 of the first link member 25a differs in shape from the fixation member 14 coupled to the recess 28 of the second link member 25b. Thus, the present embodiment uses two types of fixation members 14, first fixation members 14a and second fixation members 14b, as the fixation members 14. The structure of the first fixation members 14a and the structure of the second fixation members 14b are described separately below.

Structure of First Fixation Member 14a

Figure 6:
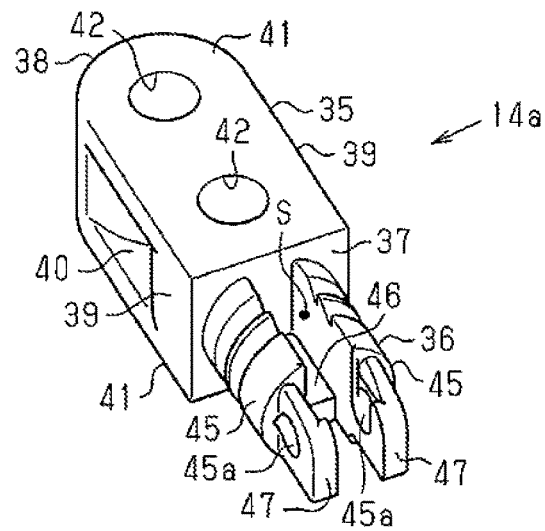
FIG. 6 is a perspective view showing a first fixation member.

As shown in FIGS. 1, 3 and 6, a first fixation member 14a coupled to the extension 27 of a first link member 25a includes a fixing portion 35, which is fixable to the attachment surface 22 of the equipment 20 and the movable member 21, and a first coupling portion 36, which serves as a coupling portion that is rotationally coupled to the extension 27 of the first link member 25a in series. The first coupling portion 36 is integral with the fixing portion 35 and projects from a flat coupling surface 37, which is a side surface of the fixing portion 35.

The fixing portion 35 substantially has the shape of a rectangular parallelepiped, and the surface of the fixing portion 35 opposite to the coupling surface 37 is a semicylindrical curved surface 38. The fixing portion 35 includes two opposite flat side surfaces 39 extending between the coupling surface 37 and the curved surface 38. The side surfaces 39 each include a recess 40. The fixing portion 35 also includes two opposite base surfaces 41, which are flat surfaces.

That is, the fixing portion 35 includes two flat base surfaces 41, which are opposite to each other and extended in the series arrangement direction. The series arrangement direction is the direction in which the first coupling portion 36 is coupled to the extension 27 of the link member 25 in series. The fixing portion 35 also includes two through-holes 42, which are arranged in the series arrangement direction (the longitudinal direction) and provide communication between the two base surfaces 41. The two through-holes 42 receive fixing bolts (not shown) when the fixing portion 35 is fixed to the attachment surface 22 of the equipment 20 or the movable member 21.

As shown in FIGS. 5 and 6, the first coupling portion 36 includes a pair of coupling plates 45 extending from the coupling surface 37 of the fixing portion 35. The coupling plates 45 are located on the opposite sides in the direction in which the two side surfaces 39 of the fixing portion 35 are located on the opposite sides. The first coupling portion 36 also includes a substantially plate-shaped third restriction portion 46, which is arranged between the two coupling plates 45 so as to connect the proximal end sections of the coupling plates 45 to the coupling surface 37 of the fixing portion 35. A clearance S is formed between the coupling plates 45 to receive the extension 27 of the link member 25.

The distal end of each coupling plate 45 includes a hole 45a extending through the coupling plate 45. That is, the pair of coupling plates 45 has a pair of holes 45a. The axis of the pair of holes 45a is perpendicular to the axis of each through-hole 42 in the fixing portion 35. The distal end faces of the coupling plates 45 function as contact surfaces 47, which come into contact with the pair of second restriction portions 30 of the first link member 25a coupled to the first coupling portion 36. The pair of shaft portions 27a of the first link member 25a is inserted into the pair of holes 45a in the first coupling portion 36, so that the first fixation member 14a and the first link member 25a are coupled to each other to be rotational about the pair of shaft portions 27a.

Figure 10:
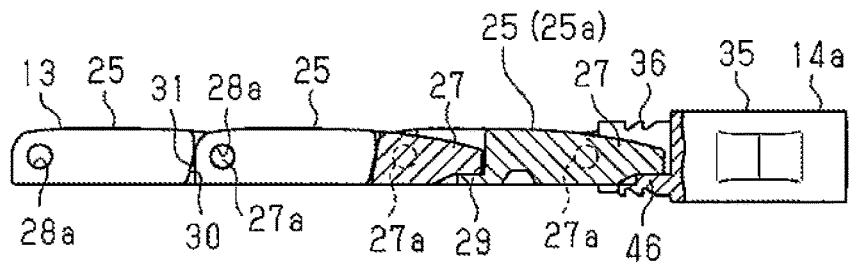
FIG. 10 is a partially cutaway side view showing the straight position of the articulated support member to which the first fixation member is coupled.

As shown in FIG. 10, the extension 27 of the first link member 25a comes into contact with the third restriction portion 46 of the first fixation member 14a, thereby restricting bending (turning) of the first fixation member 14a and the first link member 25a, which is coupled to the first fixation member 14a, in the second direction (upward as viewed in FIG. 10) from the straight position (the position shown in FIG. 10).

Figure 11:
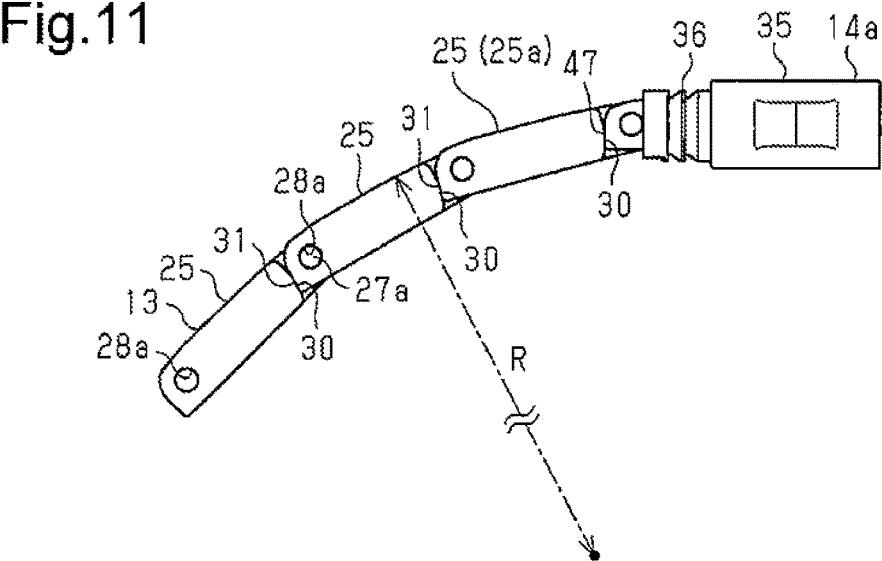
FIG. 11 is a side view showing the bent position of the articulated support member to which the first fixation member is coupled.

As shown in FIG. 11, the pair of second restriction portions 30 of the first link member 25a comes into contact with the two contact surfaces 47 of the first fixation member 14a, restricting the bending (turning) of the first fixation member 14a and the first link member 25a in the first direction (downward as viewed in FIG. 11) to the predetermined bending radius R.

Structure of Second Fixation Member 14b

Figure 7:
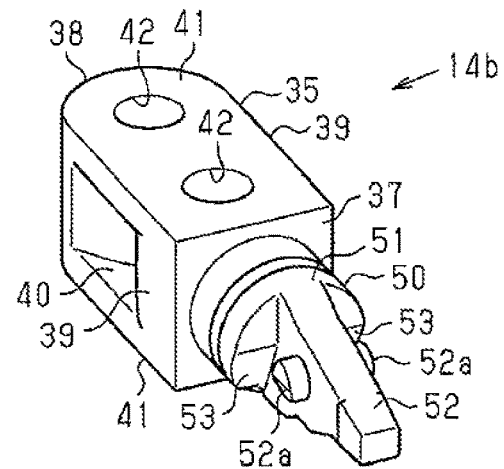
FIG. 7 is a perspective view showing a second fixation member.

As shown in FIGS. 1, 3 and 7, a second fixation member 14b coupled to the recess 28 of a second link member 25b includes a fixing portion 35 and a second coupling portion 50, which serves as a coupling portion that is rotationally coupled to the recess 28 of the second link member 25b in series. The fixing portion 35 of the second fixation member 14b has the same structure as the fixing portion 35 of the first fixation member 14a and is thus not described. The second coupling portion 50 is integral with the coupling surface 37 of the fixing portion 35.

As shown in FIG. 7, the second coupling portion 50 includes a cylindrical base 51, which protrudes from the coupling surface 37 of the fixing portion 35, and an extension 52, which projects from the central section of the distal end face of the base 51. The central section of the distal end face is located in the center in the direction in which the two side surfaces 39 of the fixing portion 35 are located on opposite sides. The extension 52 is shaped to be insertable into the recess 28 of a link member 25. A pair of shaft portions 52a protrudes from the opposite sides of the extension 52.

The axis of the pair of shaft portions 52a is perpendicular to the axis of each of the through-holes 42 in the fixing portion 35. The distal end face of the base 51 includes two inclined restriction surfaces 53 on the opposite sides of the extension 52. The inclined restriction surfaces 53 come into contact with the two contact surfaces 31 of the second link member 25b coupled to the second coupling portion 50. The pair of shaft portions 52a of the second coupling portion 50 is inserted into the pair of holes 28a in the second link member 25b, so that the second fixation member 14b and the second link member 25b are coupled to each other to be rotational about the pair of shaft portions 52a.

As shown in FIG. 8, the extension 52 of the second fixation member 14b comes into contact with the first restriction portion 29 of the second link member 25b, thereby restricting bending (turning) of the second fixation member 14b and the second link member 25b, which is coupled to the second fixation member 14b, in the second direction (upward as viewed in FIG. 8) from the straight position (the position shown in FIG. 8).

As shown in FIG. 9, the two contact surfaces 31 of the second link member 25b come into contact with the pair of the inclined restriction surfaces 53 of the second fixation member 14b, thereby restricting bending (turning) of the second fixation member 14b and the second link member 25b in the first direction (downward as viewed in FIG. 9) to the predetermined bending radius R.

The operation of the long object guide device 11 is now described.

As shown in FIGS. 1 to 3, an articulated support member 13 is inserted in each of the tubular members 12 that are located at the opposite ends in the width direction of the long object guide device 11. That is, the long object guide device 11 includes two first tubular members 12a in each of which an articulated support member 13 is inserted. In the two first tubular members 12a, the two articulated support members 13 are arranged such that they can bend in the same direction. When the long object guide device 11 is attached to the equipment 20 shown in FIG. 3, the first fixation members 14a and the second fixation members 14b are fixed to the attachment surface 22 and the movable member 21, respectively, such that the side toward which the articulated support members 13 are permitted to bend is on the same side as the inner circumference of the curved section 11a.

The first fixation members 14a and the second fixation members 14b are fixed to the attachment surface 22 and the movable member 21, respectively, by inserting and tightening bolts (not shown) in the through-holes 42 of the fixing portions 35. When the movable member 21 reciprocates in the series arrangement direction (the sideward direction as viewed in FIG. 3), the articulated support members 13 support and guide the covered wires 15 through the tubular members 12. The bending radius of the curved section 11a is maintained to be greater than or equal to the predetermined bending radius R.

The section of the long object guide device 11 between the curved section 11a and the second fixation members 14b is subjected to the force in the sagging direction caused by its own weight. The sagging direction coincides with the direction in which the articulated support members 13 are restricted from bending from the straight position. This reduces the extent of sagging of the long object guide device 11.

The width of the long object guide device 11 is changed when the number of the tubular members 12 that receive the covered wires 15, i.e., the second tubular members 12b, is changed due to a change in the number or thickness of the covered wires 15, which are protected and guided by the guide device 11. However, unlike conventional structures, the articulated support members 13, the first fixation members 14a, and the second fixation members 14b of the long object guide device 11 of the present embodiment can be used as they are even when the width of the guide device 11 is changed.

With the long object guide device 11 of the present embodiment, any change in the thickness (type) or the number of the covered wires 15, which are protected and guided by the guide device 11, does not require modification of the articulated support members 13, the first fixation members 14a, or the second fixation members 14b. The long object guide device 11 is therefore versatile.

The above described embodiment achieves the following advantages.

(1) The long object guide device 11 includes the first fixation members 14a that are fixable to the attachment surface 22 of the equipment 20 while coupled to the first link members 25a, which are the link members 25 of the articulated support members 13 that correspond to the fixed end of the long object guide device 11. The long object guide device 11 also includes the second fixation members 14b that are fixable to the movable member 21 while coupled to the second link members 25b, which correspond to the movable end of the long object guide device 11. Consequently, any change in the width of the long object guide device 11 resulting from a change in the type or the number of the covered wires 15, which are protected and guided by the long object guide device 11, does not require modification of the first fixation members 14a or the second fixation members 14b. Therefore, the long object guide device 11 is versatile. The first fixation members 14a and the second fixation members 14b of the long object guide device 11 are made of synthetic plastic. This reduces the width and weight of the long object guide device 11 as compared to the conventional structure that uses metal first and second connector units.

(2) The long object guide device 11 includes a plurality of flexible tubular members 12. The tubular members 12 are coupled together and arranged in parallel. The plurality of tubular members 12 includes at least one first tubular member 12a in which an articulated support member 13 is inserted and at least one second tubular member 12b in which covered wires 15 are inserted. The articulated support members 13 thus support the covered wires 15 through the tubular members 12. Further, the tubular members 12 (the first tubular members 12a) enclose the articulated support members 13. This limits scattering of abrasion particles, which may be generated by rotation of the link members 25 of the articulated support members 13, to the surrounding environment. Sealing the openings of the first tubular members 12a, in which the articulated support members 13 are inserted, substantially completely confines the abrasion particles of the articulated support members 13 within the first tubular members 12a. The long object guide device 11 is therefore suitable for use in a clean room, for example.

(3) In the long object guide device 11, each first fixation member 14a includes a fixing portion 35, which is fixable to the attachment surface 22 of the equipment 20, and a first coupling portion 36, which is rotationally coupled to the extension 27 of a first link member 25a. In addition, each second fixation member 14b includes a fixing portion 35, which is fixable to the movable member 21, and a second coupling portion 50, which is rotationally coupled to the recess 28 of a second link member 25b. As such, the first fixation members 14a and the second fixation members 14b can rotate relative to the first link members 25a and the second link members 25b, respectively. This allows for reduction of the extra length (the length required for fixing) of the articulated support members 13.

(4) In the long object guide device 11, each first fixation member 14a is integral with the first coupling portion 36, and each second fixation member 14b is integral with the second coupling portion 50. This helps to reduce the number of components of the long object guide device 11.

(5) The fixing portion 35 of each of the first fixation members 14a and the second fixation members 14b of the long object guide device 11 includes two base surfaces 41, which are flat surfaces extending in the series arrangement direction and opposite to each other. Such a structure achieves the following advantages when multiple first fixation members 14a are stacked and fixed to the attachment surface 22 of the equipment 20, or when multiple second fixation members 14b are stacked and fixed to the movable member 21. That is, as for the multiple first fixation members 14a, stacking the base surfaces 41 of the fixing portions 35 on top of each other allows the multiple first fixation members 14a to be stacked in a stable manner. As for the multiple second fixation members 14b, stacking the base surfaces 41 of the fixing portions 35 on top of each other allows the multiple second fixation members 14b to be stacked in a stable manner. The stacked first fixation members 14a are fastened together and fixed to the attachment surface 22 of the equipment 20 by inserting bolts into the through-holes 42 in the fixing portions 35. The stacked second fixation members 14b are fastened together and fixed to the movable member 21 by inserting bolts into the through-holes 42 in the fixing portions 35.

(6) Each first fixation member 14a is coupled to a first link member 25a simply by inserting the pair of shaft portions 27a of the first link member 25a into the pair of holes 45a of the first coupling portion 36. As such, the first fixation member 14a and the first link member 25a can be easily assembled without requiring a special tool.

(7) Each second fixation member 14b is coupled to a second link member 25b simply by inserting the pair of shaft portions 52a of the second coupling portion 50 into the pair of holes 28a of the second link member 25b. As such, the second fixation member 14b and the second link member 25b can be easily assembled without requiring a special tool.

Modifications

The above-described embodiment may be modified as follows.

Figure 12:
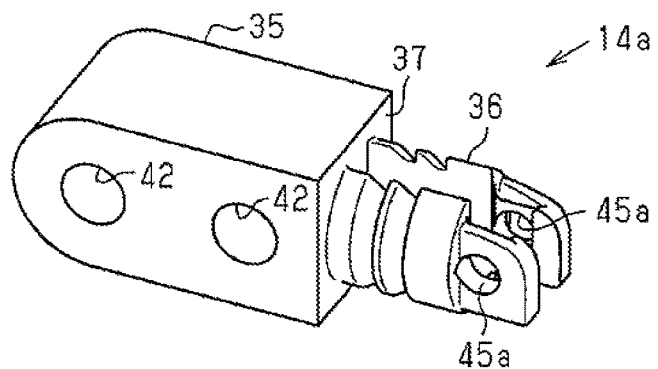
FIG. 12 is a perspective view showing a first fixation member of a first modification.

As shown in FIG. 12, in each first fixation member 14a, the fixing portion 35 may be rotated relative to the first coupling portion 36 by 90°. In this case, the axis of each through-hole 42 is parallel to the axis of the holes 45a. Similarly, in each second fixation member 14b, the fixing portion 35 may be rotated relative to the second coupling portion 50 by 90°. The recesses 40 of the fixing portion 35 may be omitted.

Figure 13:
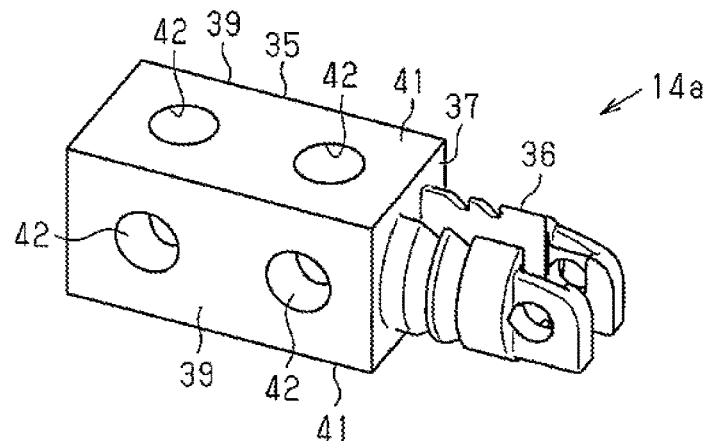
FIG. 13 is a perspective view showing a first fixation member of a second modification.

As shown in FIG. 13, the fixing portion 35 of a first fixation member 14a does not have to include the recesses 40 and may include a flat surface in place of the curved surface 38. Further, the fixing portion 35 may include two through-holes 42 providing communication between the two side surfaces 39. This increases the degrees of freedom in the orientation of the fixing portion 35 when fastening the fixing portion 35 with bolts (not shown). Similarly, the fixing portion 35 of a second fixation member 14b does not have to include the recesses 40 and may include a flat surface in place of the curved surface 38. Further, the fixing portion 35 may include two through-holes 42 providing communication between the two side surfaces 39.

Figure 14:
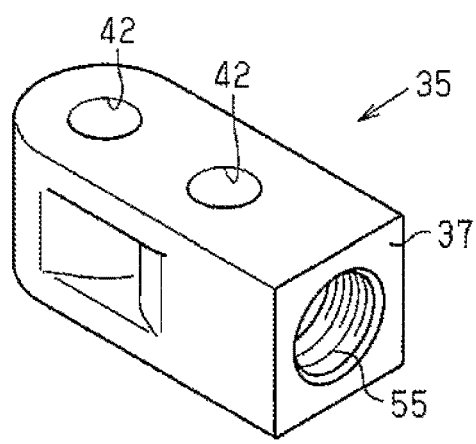
FIG. 14 is a perspective view showing a fixing portion of a third modification.
Figure 15:
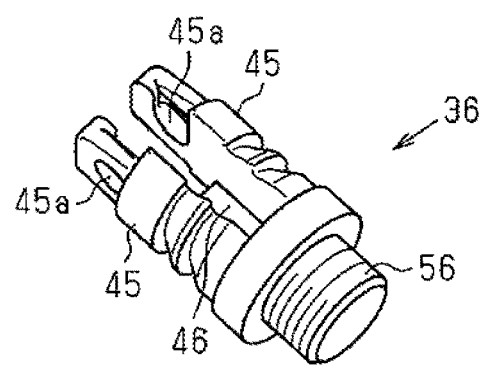
FIG. 15 is a perspective view showing a first coupling portion of the third modification.

As shown in FIGS. 14 and 15, the fixing portion 35 and the first coupling portion 36 of a first fixation member 14a (see FIG. 6) may be separate parts. The first coupling portion 36 may be coupled to the fixing portion 35 in a removable manner. In this case, an internal threaded portion 55 is formed in the coupling surface 37 of the fixing portion 35, and an external threaded portion 56, which is engageable with the internal threaded portion 55, is formed in the proximal end of the first coupling portion 36.

Figure 16:
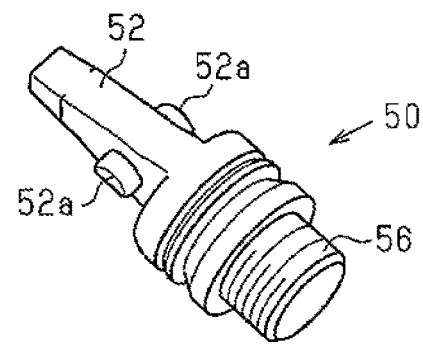
FIG. 16 is a perspective view showing a second coupling portion of the third modification.

As shown in FIGS. 14 and 16, the fixing portion 35 and the second coupling portion 50 of a second fixation member 14b (see FIG. 7) may be separate parts. The second coupling portion 50 may be coupled to the fixing portion 35 in a removable manner. In this case, an internal threaded portion 55 is formed in the coupling surface 37 of the fixing portion 35, and an external threaded portion 56, which is engageable with the internal threaded portion 55, is formed in the proximal end of the second coupling portion 50.

Figure 17:
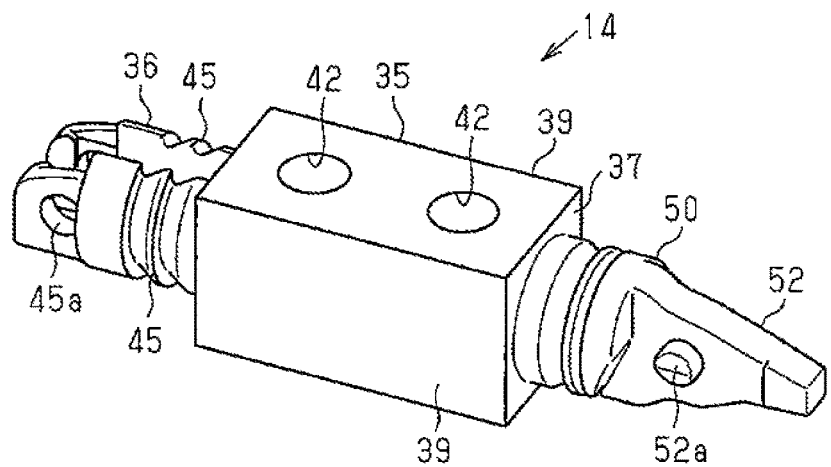
FIG. 17 is a perspective view showing a fixation member of a fourth modification.

As shown in FIG. 17, the fixing portion 35 of a fixation member 14 does not have to include the recesses 40 and may include a flat surface in place of the curved surface 38. Further, the fixation member 14 may be formed by placing a second coupling portion 50 on the coupling surface 37 of the fixing portion 35 and by placing a first coupling portion 36 on the surface of the fixing portion 35 opposite to the coupling surface 37. The first coupling portion 36 and the second coupling portion 50 may be integral with the fixing portion 35, or at least one of the first coupling portion 36 and the second coupling portion 50 may be removal from the fixing portion 35.

Figure 18:
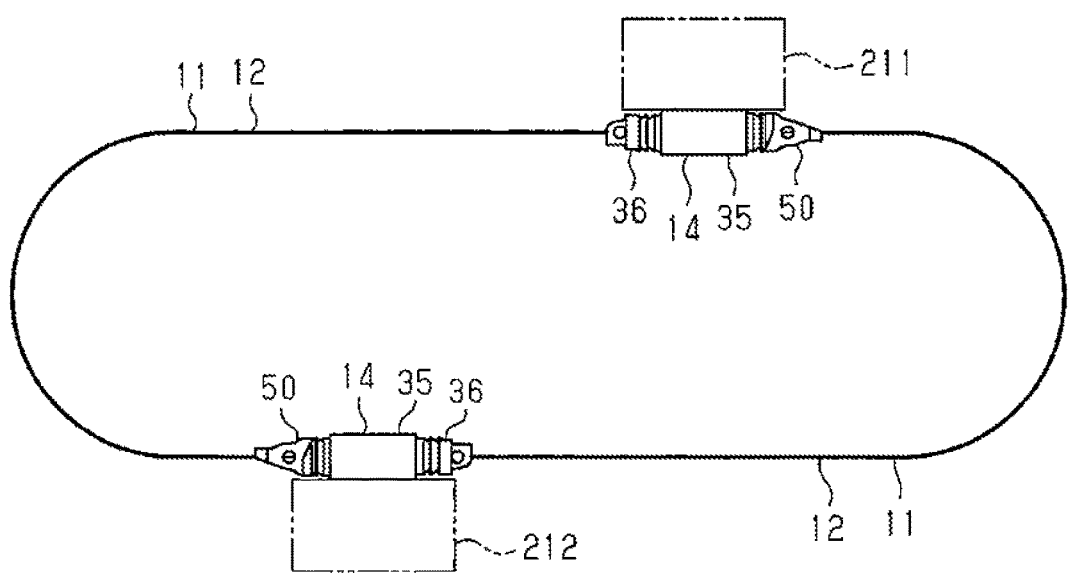
FIG. 18 is a schematic view showing the state in which the long object guide device of a modification including the fixation members of FIG. 17 is used.

As shown in FIG. 18, two long object guide devices 11 may be coupled to each other into a loop, with the two ends of one of the long object guide devices 11 coupled to the two ends of the other using the fixation members 14 shown in FIG. 17. The fixing portions 35 of the two fixation members 14 may be fixed to a first movable member 211 and a second movable member 212. In this case, the first and second movable members 211 and 212 face each other and reciprocate in the opposite directions. That is, as viewed in FIG. 18, when the first movable member 211 moves leftward, the second movable member 212 moves rightward by the same amount as the first movable member 211. When the first movable member 211 moves rightward, the second movable member 212 moves leftward by the same amount as the first movable member 211.

Figure 19:
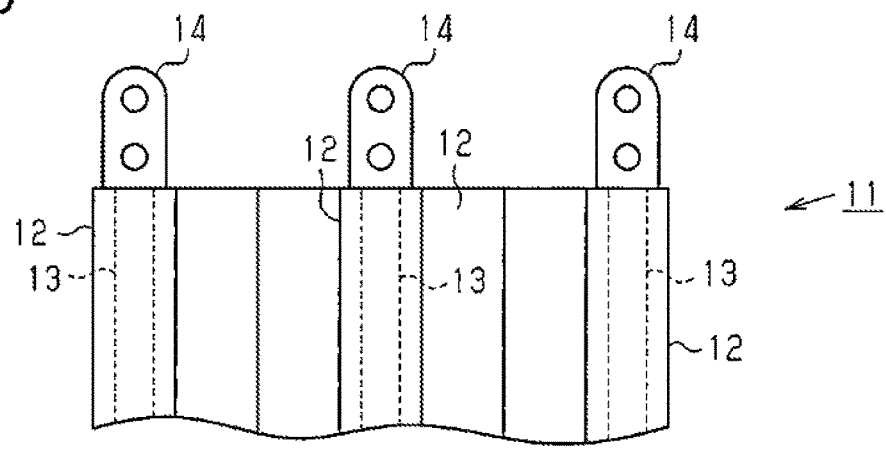
FIG. 19 is an enlarged plan view showing the relevant part of the long object guide device of a modification that differs from the modification of FIG. 18.

As shown in FIG. 19, the tubular member 12 that is located at the center in the width direction of the long object guide device 11 may receive an articulated support member 13 instead of covered wires 15. This allows a plurality of covered wires 15 to be supported not only at the ends in the width direction of the long object guide device 11 but also at the center and therefore protected and guided in a satisfactory manner even when the covered wires 15 are heavy.

Figure 20:
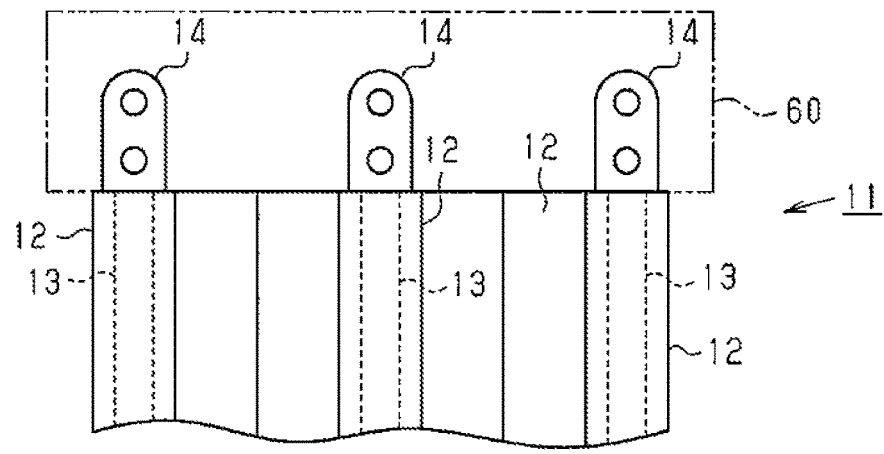
FIG. 20 is an enlarged plan view showing the relevant part of the long object guide device of a modification that differs from the modifications of FIGS. 18 and 19.

As shown in FIG. 20, the long object guide device 11 of FIG. 19 may include a case 60, which substantially has the shape of a rectangular parallelepiped and covers three fixation members 14. The three fixation members 14 are fixed to the attachment surface 22 of the equipment 20 or the movable member 21 through the case 60.

Figure 21:
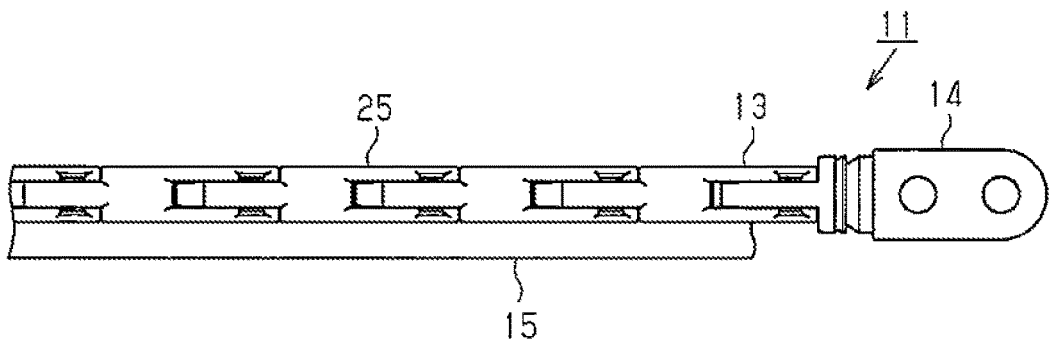
FIG. 21 is an enlarged plan view showing the relevant part of the long object guide device of a modification that differs from the modifications of FIGS. 18 to 20.

As shown in FIG. 21, in the long object guide device 11, the tubular members 12 may be omitted, and a single articulated support member 13 may be used to directly support a covered wire 15. In this case, the covered wire 15 is fixed to a side surface of the articulated support member 13 using an adhesive or a two-sided adhesive tape, for example.

The fixing portion 35 of each of the first fixation members 14a and the second fixation members 14b of the long object guide device 11 includes the two base surfaces 41, which extend in the series arrangement direction and are opposite to each other. The base surfaces 41 do not have to be flat surfaces. That is, at least one of the two base surfaces 41 of a fixing portion 35 may be a curved surface.

The first coupling portions 36 and the second coupling portions 50 of the first fixation members 14a and the second fixation members 14b of the long object guide device 11 do not have to be coupled to the first link members 25a and the second link members 25b, respectively, in a rotational manner. That is, the first coupling portions 36 and the second coupling portions 50 of the first fixation members 14a and the second fixation members 14b may be fixed to the first link members 25a and the second link members 25b in a non-rotational manner.

In the long object guide device 11, the total number of tubular members 12, the number of first tubular members 12a of the tubular members 12 that receive articulated support members 13, and the number of second tubular members 12b that receive covered wires 15 may be changed freely. A plurality of tubular members 12 may include a tubular member that does not receive any object.

The long objects may be objects other than the covered wires 15 for feeding power to the movable member 21, such as optical fiber cables for delivering signals to the movable member 21 or hoses for supplying gas (e.g., air) or liquid (e.g., water or oil) to the movable member 21.

DESCRIPTION OF THE REFERENCE NUMERALS

11... Long Object Guide Device, 12... Tubular Member, 12a... First Tubular Member, 12b... Second Tubular Member, 13... Articulated Support Member, 14... Fixation Member, 15... Covered Wire as Long Object, 20... Equipment as Counterpart Member, 21... Movable Member as Counterpart Member, 211... First Movable Member as Counterpart Member, 212... Second Movable Member as Counterpart Member, 25... Link Member, 35... Fixing Portion, 36... First Coupling Portion as Coupling Portion, 41... Base Surface as Flat Surface, 50... Second Coupling Portion as Coupling Portion, R... Predetermined Bending Radius

The invention claimed is:

1. A long object guide device for protecting and guiding a flexible long object, the long object guide device comprising:
an articulated support member including a plurality of link members arranged in series,
wherein adjacent ones of the link members are rotationally coupled to each other,
wherein the articulated support member is permitted to turn to a predetermined bending radius in a first direction that intersects a series arrangement direction,
wherein the articulated support member is restricted from turning in a second direction that is opposite to the first direction,
wherein the guide device includes an end,
wherein the guide device includes a fixation member that is fixable to a movable member while coupled to one of the link members that corresponds to the end of the guide device,
wherein the series arrangement direction is a direction in which the fixation member is coupled to the one of the link members,
wherein the fixation member includes
a fixing portion, which is fixable to the movable member, and
a coupling portion, which is rotationally coupled to the link member that corresponds to the end of the guide device, and wherein the fixing portion and the coupling portion are separate parts, the coupling portion being coupled to the fixing portion in a removable manner.

2. The long object guide device according to claim 1, further comprising a plurality of flexible tubular members coupled together and arranged in parallel,
wherein the plurality of tubular members include
at least one first tubular member in which the articulated support member is inserted, and
at least one second tubular member in which the long object is inserted.

3. The long object guide device according to claim 1, wherein the fixing portion includes two flat surfaces, which are opposite to each other and extended parallel to the series arrangement direction.

4. A fixation member for a long object guide device for protecting and guiding a flexible long object, comprising
a coupling portion configured to be rotationally coupled to one of a plurality of link members that corresponds to an end of the long object guide device, and
a fixing portion, which is fixable to a movable member,
wherein the fixing portion and the coupling portion are separate parts, the coupling portion being coupled to the fixing portion in a removable manner,
wherein the long object guide device includes an articulated support member including the plurality of link members arranged in series,
wherein adjacent ones of the link members are rotationally coupled to each other,
wherein the articulated support member is permitted to turn to a predetermined bending radius in a first direction that intersects a series arrangement direction, the series arrangement direction being a direction in which the fixation member is coupled to the one of the plurality of link members, and
wherein the articulated support member is restricted from turning in a second direction that is opposite to the first direction.

* * * * *